(12) United States Patent
Iwazaki

(10) Patent No.: US 6,885,926 B2
(45) Date of Patent: Apr. 26, 2005

(54) AUTOMATIC STEERING CONTROL SYSTEM AND METHOD

(75) Inventor: Katsuhiko Iwazaki, Shizuoka-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/393,271

(22) Filed: Mar. 21, 2003

(65) Prior Publication Data

US 2003/0182038 A1 Sep. 25, 2003

(30) Foreign Application Priority Data

Mar. 22, 2002 (JP) ........................................ 2002-080967

(51) Int. Cl.$^7$ ................................................ B62D 5/04
(52) U.S. Cl. .......................... 701/41; 701/72; 180/6.2; 475/19
(58) Field of Search ............................ 701/41, 23, 301, 701/37, 208, 72, 42, 43, 82; 180/443, 446, 204, 408, 411, 403, 197, 246, 142, 65.1, 6.2, 248, 233, 445, 422; 342/165; 382/103, 190; 280/91; 475/18, 19

(56) References Cited

U.S. PATENT DOCUMENTS

| | | | | |
|---|---|---|---|---|
| 5,276,626 A | * | 1/1994 | Ihara et al. .................. 340/988 |
| 5,388,658 A | * | 2/1995 | Ando et al. .................. 180/197 |
| 5,703,775 A | * | 12/1997 | Yamamoto et al. ........... 701/41 |
| 5,878,362 A | * | 3/1999 | Sekine et al. ................. 701/41 |
| 6,144,908 A | * | 11/2000 | Yasuda ......................... 701/41 |
| 6,212,452 B1 | | 4/2001 | Shimizu et al. .............. 701/41 |
| 6,799,656 B1 | * | 10/2004 | Kimura et al. ............. 180/446 |
| 2001/0027364 A1 | * | 10/2001 | Matsuoka .................... 701/41 |
| 2002/0016657 A1 | * | 2/2002 | Iwazaki ....................... 701/41 |

FOREIGN PATENT DOCUMENTS

| | | | |
|---|---|---|---|
| EP | 1 270 367 A2 | 6/1992 | |
| JP | 02024271 A | * 1/1990 | ............ B62D/6/02 |
| JP | 409193691 A | * 7/1997 | |
| JP | 410167104 A | * 6/1998 | |
| JP | 2001138941 A | 11/1999 | |
| JP | 02001063599 A | * 3/2001 | |
| JP | 2001082200 A | * 3/2001 | ............ F02D/29/02 |
| JP | 2001253353 A | * 9/2001 | ............ B62D/6/00 |

* cited by examiner

Primary Examiner—Thomas G. Black
Assistant Examiner—Tuan C To
(74) Attorney, Agent, or Firm—Oliff & Berridge, PLC

(57) ABSTRACT

The steering angle with respect to the running distance is changed by changing the steering angular velocity in accordance with the steering angle and the vehicle speed such that the turning rate has a linear relationship with the moving distance.

10 Claims, 5 Drawing Sheets

RUNNING DISTANCE (m)

AUTOMATIC STEERING CONTROL SYSTEM AND METHOD

INCORPORATION BY REFERENCE

The disclosure of Japanese Patent Application No. 2002-080967 filed on Mar. 22, 2002, including the specification, drawings and abstract is incorporated herein by reference in its entity

BACKGROUND OF THE INVENTION

1. Field of Invention

The invention relates to automatic steering control system and method incorporated in a parking assist system or the like.

2. Description of Related Art

There is known an assist system which facilitates parking, such as tandem parking and parallel parking, of a vehicle by an automatic steering control system assisting a driver in moving the vehicle to a target parking position determined by the driver. For example, such an assist system is disclosed in Japanese Laid-open Patent Publication No. 2001-138941. This system performs a steering control based on a moving route stored in advance as the relationship of the steering angle of the steering wheel wit respect to the moving distance (i.e., running distance) of the vehicle. Also, the system limits the vehicle speed such that the steering angular velocity is maintained within a predetermined range to prevent the vehicle from running at an excessive speed and thus reduce the possibility for the vehicle to deviate from the moving route.

For guiding the vehicle to the target position, it is necessary to move the vehicle to the target portion and make the deviation angle of the vehicle (an angle of the vehicle about its reference direction) equal to a target deviation angle. Since the deviation angle of the vehicle can be obtained from the relationship of change of the turning rate (an inverse of the turning radius) with respect to the moving distance of the vehicle, the moving route, to be stored as aforementioned, can be determined by setting the turning rate with respect to the moving distance of the vehicle.

According to the above-described conventional automatic steering control system, the steering angle is changed at a constant steering angular velocity with respect to a certain vehicle speed. In vehicles, however, a nonlinear relationship is normally established between the steering angle of the steering wheel and the turning rate as shown FIG. 1. Therefore, as shown FIG. 2, when the steering angle is changed at a constant steering angular velocity while the vehicle is moving at a constant vehicle speed (line A), the turning rate nonlinearly changes with respect to the moving distance as represented by the line B. Thus, it is necessary to execute complicated numerical analysis in calculations between the deviation angle and the moving distance, which may be time-consuming in some cases. For example, when the route is corrected during the automatic-steering control, the calculation for setting the route may not be able to catch up with the actual moving speed of the vehicle.

SUMMARY OF THE INVENTION

It is therefore an object of the invention to provide automatic steering control system and method which permit simplification of a route setting process, a route correction process, and the like.

Actually, the above object may be achieved by linearizing the relationship between the steering angle and the turning rate shown in FIG. 1. However, for maintaining the relationship between the steering angle and the turning rate as shown in FIG. 1 at the neutral steering position, the required operation amount of the steering becomes larger than the value set in the automatic steering control system disclosed in Japanese Laid-open Patent Publication No. 2001-138941, which may cause an operator to have a feeling of unnaturalness. In contrast, if the turning rate obtained when an absolute value of the turning rate is maximum is set equal to the value set in the automatic steering control system disclosed in the above publication, the change amount of the turning rate with respect to changes in the steering angle at or around the neutral steering position becomes large. In this case, therefore, the operator may have a feeling of unnaturalness in operating the steering, and may have a difficulty in making minor course changes which are necessary, for example, for making a lane change on a high way. Consequently, the above-described arrangements are considered to be impracticable.

In view of the above situation, an automatic steering control system according to a first aspect of the invention is arranged to control the steering angular velocity such that the turning rate linearly changes with respect to the moving distance when changing the turning rate.

When the steering angular velocity is adjusted at the time of changing the taming rate such that the tug rate linearly changes with respect to the moving distance, it permits mutual conversions to be analytically performed between the deviation angle and its moving distance. This eliminates the necessity of executing complicated numerical analysis, thus simplifying the calculation processes. Furthermore, since analytical calculations are executed, accumulation of errors which may take place in numerical analysis is not caused, whereby the calculation speed can increase and further calculation accuracy can be achieved. Therefore, for example, a vehicle can be reliably moved along a set route and the steering can be effectively operated up to the maximum steering angle during the automatic steering control.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Figure 1:
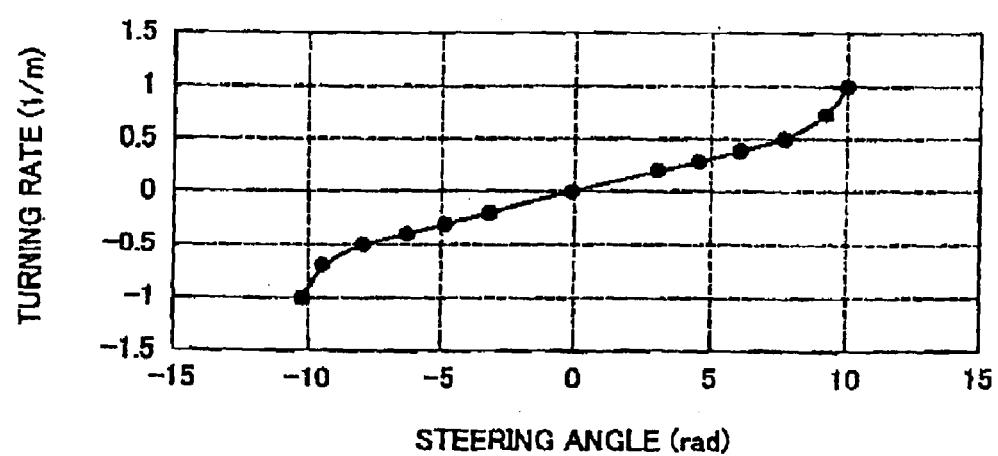
FIG. 1 is a graph showing the relationship between the steering angle and the turning rate which is normally established in vehicles.

Hereafter, a preferred embodiment of the invention will be explained with reference to the accompanying drawings. In order to facilitate understanding of the explanation, the same reference numerals and characters will, as much as possible, be assigned to the same components in each drawing, and overlapping explanations will be omitted.

Figure 3:
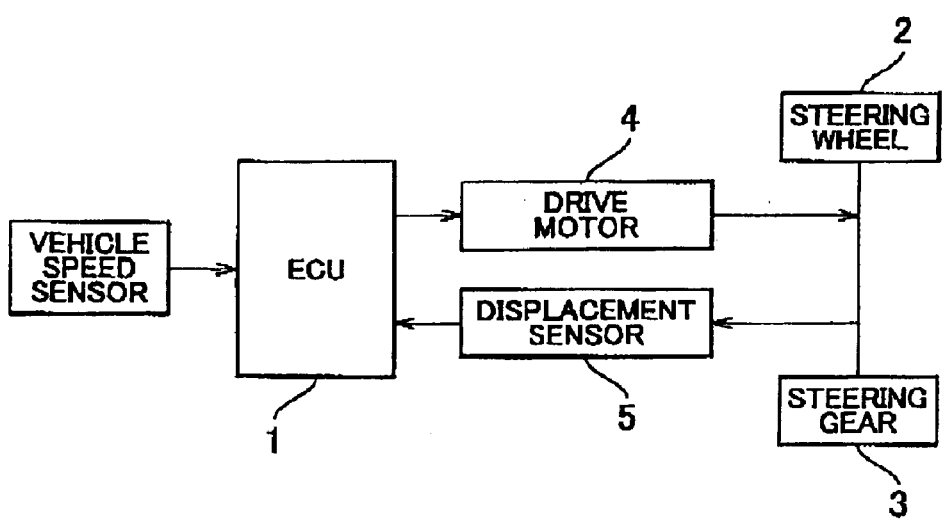
FIG. 3 is a view schematically showing the configuration of an automatic steering control system according to one embodiment of the invention.

FIG. 3 is a block diagram schematically showing the configuration of an automatic steering control system 10 according to one embodiment of the invention, which is used in a vehicle. Referring to FIG. 3, the automatic steering control system 10 includes an ECU (Electronic Control Unit) 1, a drive motor 4, and a displacement sensor 5. The ECU 1 includes a CPU, a ROM, a RAM, an input signal circuit, an output signal circuit, a power supply circuit, and so on, and is adapted to control the operation of the automatic steering control system 10. The drive motor 4 is disposed between a steering wheel 2 and a steering gear 3 and serves also as a power steering device. The displacement sensor 5 is arranged to detect the displacement amount of the steering. Also, the ECU I receives signals output from the displacement sensor 5 and a vehicle speed sensor 6 and is adapted to control the driving of the drive motor 4. Here, it is to be noted that the steering wheel 2 can, in this embodiment, be regarded as "a vehicle wheel drive device" of the invention The relationship established between the steering angle of the steering wheel 2 and the tug rate of the vehicle is represented in the graph of FIG. 1. Referring to the graph, when the steering angle is φ and the turning rate is γ, their relationship is re ted as follows:

$$\gamma = f(\phi) \quad (1)$$

Then, the relationship between the moving distance (i.e., running distance) p of the vehicle and the turning rate γ established when the steering is operated to a target steering angle at a constant steering angular velocity ω per unit distance is represented as follows:

$$\gamma = f(\omega \times p) \quad (2)$$

Figure 2:
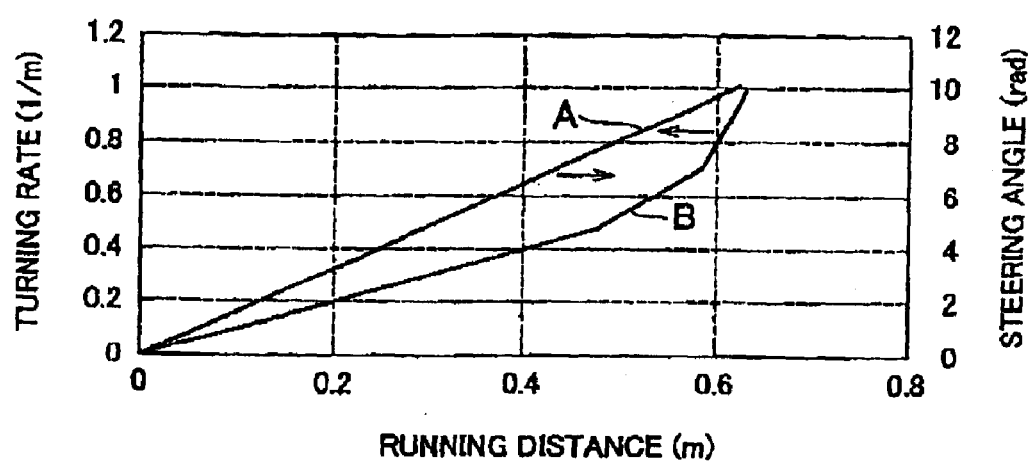
FIG. 2 is a graph showing the relationship among the moving distance, the steering angle, and the turning rate, which is established in the automatic steering control system disclosed in Japanese Laid-open Patent Publication No. 2001-138941.

The line B of FIG. 2 corresponds to this relationship. Then, the deviation angle θ of the vehicle is obtained by the following expression:

$$\theta = \int_0^p \gamma \, dp \quad (3)$$

As aforementioned, since the turning rate γ has a nonlinear relationship with respect to the moving distance, the expression (3) can not be analytically solved. Thus, a numerical integration needs to be executed to solve it.

To this end, the automatic steering control system 10 of the embodiment incorporates an algorithm formulated to linearize the relationship of the steering angle φ with respect to the moving distance p. That is, the change amount Δγ of the turning rate γ when the steering angle φ has slightly changed by Δφ from the expression (1) is represented as follows:

$$\Delta \gamma = \frac{d}{d\phi} f(\phi) \Delta \phi \quad (4)$$

Then, the minimum value of the inclination of the change in γ of the expression (4) is represented as "Jmin" as follows:

$$J\min = \min \left[ \left| \frac{d}{d\phi} f(\phi) \right| \right] \quad (5)$$

Subsequently, the inclination of the change in γ is normalized by Jmin to obtain m (φ).

$$m(\phi) = \frac{1}{J\min} \frac{d}{d\phi} f(\phi) \quad (6)$$

When the values are set in the above manner, the change amount of the turning rate when the steering is turned by a certain steering angle φ is m (φ) times of Jmin. The m (φ) is changed according to the steering angle φ.

$$\Delta \gamma = m(\phi) J\min \Delta \phi \quad (7)$$

Hereinafter, m (φ) will be referred to as "a gradient ratio."

Here, the steering angular velocity ω is not always constant but is changed in accordance with the steering angle φ and the vehicle speed using the following expression:

$$\omega = \frac{\alpha}{m(\phi)} V \quad (8)$$

Here, α is a constant. That is, the steering angular velocity ω changes in proportion to the vehicle speed V and an inverse of the gradient ratio m (φ). Assuming that the maximum vehicle speed which the automatic steering control system is able to catch up with is represented as "Vmax" and the maximum steering angular velocity ω corresponding to the maximum vehicle speed Vmax is represented as "ωmax", α is preferably set to ωmax/Vmax when m (ω) is 1.

Thus, the increase amount of the steering angle φ according to a change in the moving distance while increasing the steering angle is represented as follows:

$$\Delta \phi = \frac{\alpha}{m(\phi)} \Delta p \quad (9)$$

Then, by assigning the expression (9) to the expression (7), it becomes:

$$\Delta \gamma = m(\phi) J\min \frac{\alpha}{m(\phi)} \Delta p = J\min \alpha \Delta p \quad (10)$$

Thus, the relationship between γ and p is linearized.

More specifically, the ECU 1 determines the operation amount of the steering wheel 2, to be driven by the drive motor 4, per unit time by executing the expression (8) using the displacement amount of the steering wheel 2 (which corresponds to the steering angle φ) detected by the displacement sensor 5 and the vehicle speed V indicated by the signal output from the vehicle sensor 6. The ECU I then controls the drive motor 4 in accordance with the determined operation amount of the steering wheel 2.

Figure 4:
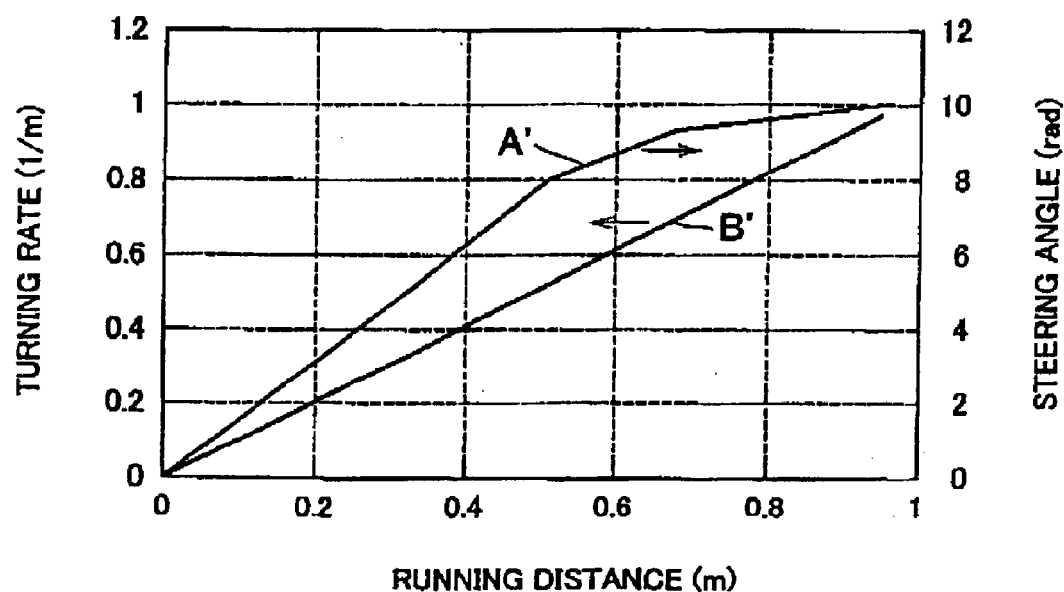
FIG. 4 is a graph showing the relationship among the moving distance, the steering angle, and the turning rate, which is established in the automatic steering control system according to the embodiment of the invention.

FIG. 4 is a graph showing changes in the steering angle φ and the turning rate γ with respect to the moving distance p of the vehicle which is running by the automatic steering control system when "α=ωmax/Vmax" is set according to the expression (8). As the steering angle φ, represented by the line A', increases, its change amount with respect to the moving distance p reduces in proportion to an inverse of the gradient ratio m (φ). On the other hand, the turning rate γ, represented by the line B', linearly changes with respect to the moving distance p.

Figure 5:
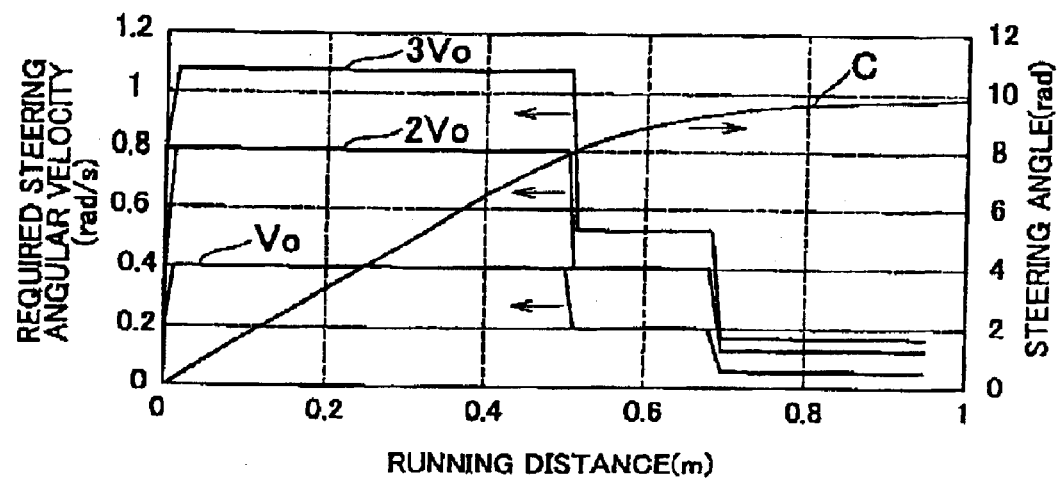
FIG. 5 is a graph showing the relationship among the moving distance, the steering angular velocity, and the steering angle, which is established in the automatic steering control system according to the embodiment of the invention when the vehicle runs at different speeds.

FIG. 5 is a graph for comparing changes in the steering angular velocity ω and the steering angle φ with respect to the moving distance p when the vehicle moves at a constant vehicle speed Vo, a speed two times faster than Vo, and a speed three times faster than Vo. According to the expression (8), the steering angular velocity ω changes in proportion to the vehicle speed V. Thus, the change amount of the steering angle per unit distance is always constant, rather than changing in accordance with the vehicle speed. Therefore, the steering angle, represented by the line C, changes in the same manner in any case. Accordingly, the turning rate can be linearized with respect to the moving distance p independent of the vehicle speed.

With the relationship of the turning rate γ with respect to the moving distance p which has been linearized as described above, the deviation angle θ is obtained by the following expression after solving the following expression (3) analytically.

$$\theta = \frac{Jmin\alpha}{2}p^2 \qquad (11)$$

Conversely, it is also possible to obtain the moving distance p from a necessary deviation angle θ. According to the embodiment, therefore, the necessity of executing complicated numerical analysis in parking assist systems, running assist systems, and the like, which perform an automatic steering control, can be eliminated, which makes it possible to simplify the construction of such systems. According to the embodiment, moreover, since analytical calculations are executed, accumulation of errors which may take place in numerical analysis is not caused, whereby the route calculation speed can increase and further calculation accuracy can be achieved.

As described above, since a linear relationship is established between the turning rate and the moving distance in the automatic steering control system of the embodiment, the calculations between those values can be analytically executed and be simplified, which assures an increased route calculation speed as well as improved calculation accuracy.

What is claimed is:

1. An automatic steering control system comprising: a controller which automatically changes a steering angle in accordance with a determined direction change along a moving distance and which controls a steering angular velocity such that a turning rate linearly changes with respect to the moving distance when changing the turning rate.

2. The automatic steering control system according to claim 1, further comprising a vehicle wheel drive device that manipulates a wheel of a vehicle, wherein the controller automatically changes the steering angle of the vehicle wheel drive device such that the vehicle controls the steering angular velocity of the vehicle wheel drive device such that the turning rate of the vehicle linearly changes with respect to the moving distance of the vehicle when changing the turning rate.

3. The automatic steering control system according to claim 2, wherein the steering angular velocity is changed in proportion to vehicle speed and an inverse of a value obtained by normalizing a change amount of the turning rate with respect to the steering angle by a minimum value of the change amount of the turning rate.

4. The automatic steering control system according to claim 1, wherein the turning rate is determined using an algorithm formulated to linearize the relationship of the steering angle with respect to the moving distance.

5. The automatic steering control system according to claim 1, wherein the controller changes the steering angular velocity in accordance with the moving distance.

6. An automatic steering control method comprising: automatically changing a steering angle in accordance with a determined direction change alone a moving distance; and controlling a steering angular velocity such that a turning rate linearly changes with respect to a moving distance when changing the turning rate.

7. The method according to claim 6, wherein automatically changing the steering angle such that a vehicle controlling the steering angular velocity such that the turning rate of the vehicle linearly changes with respect to the moving distance of the vehicle when changing the turning rate.

8. The method according to claim 7, wherein the steering angular velocity is changed in proportion to vehicle speed and an inverse of a value obtained by normalizing a change amount of the turning rate with respect to the steering angle by a minimum value of the change amount of the turning rate.

9. The method according to claim 6, wherein the turning rate is determined using an algorithm formulated to linearize the relationship of the steering angle with respect to the moving distance.

10. The method according to claim 6, wherein the steering angular velocity is changed in accordance with the moving distance.

\* \* \* \* \*